United States Patent
Humphries et al.

(12) 
(10) Patent No.: US 9,942,842 B1
(45) Date of Patent: Apr. 10, 2018

(54) POWER SAVING MODE FOR RADIO COMMUNICATION SYSTEMS

(71) Applicant: Rockwell Collins, Inc., Cedar Rapids, IA (US)

(72) Inventors: Thomas S. Humphries, Cedar Rapids, IA (US); David W. Hill, Holy Cross, IA (US); Neal J. Buchmeyer, Cedar Rapids, IA (US); Maury J. Anderson, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 87 days.

(21) Appl. No.: 14/448,437

(22) Filed: Jul. 31, 2014

(51) Int. Cl.
| H04W 52/02 | (2009.01) |
| H04L 7/00 | (2006.01) |
| H04J 3/16 | (2006.01) |

(52) U.S. Cl.
CPC ....... H04W 52/0209 (2013.01); H04J 3/1694 (2013.01); H04L 7/0033 (2013.01)

(58) Field of Classification Search
CPC ..... H04W 52/0225–52/0248; H04W 52/0216; H04W 76/048
See application file for complete search history.

(56) References Cited

U.S. PATENT DOCUMENTS

| 5,625,882 | A * | 4/1997 | Vook | H04B 1/1615 340/7.34 |
| 6,804,542 | B1 * | 10/2004 | Haartsen | H04W 52/0229 340/7.38 |
| 7,555,663 | B2 * | 6/2009 | Krantz | G06F 1/3203 713/300 |
| 8,149,748 | B2 * | 4/2012 | Bata | H04W 84/18 370/310 |
| 2004/0235537 | A1 * | 11/2004 | Koga | H04M 1/72516 455/574 |
| 2007/0135079 | A1 * | 6/2007 | Bromley | H04L 7/042 455/343.1 |
| 2007/0159301 | A1 * | 7/2007 | Hirt | H04W 52/0216 340/10.1 |
| 2008/0232270 | A1 * | 9/2008 | Fleming | H04L 12/12 370/254 |
| 2011/0074623 | A1 * | 3/2011 | Baker | H04W 52/0229 342/175 |
| 2012/0308034 | A1 * | 12/2012 | El-Hoiydi | H04B 7/0671 381/77 |

* cited by examiner

*Primary Examiner* — Khaled Kassim
*Assistant Examiner* — Zhaohui Yang
(74) *Attorney, Agent, or Firm* — Angel N. Gerdzhikov; Donna P. Suchy; Daniel M. Barbieri

(57) ABSTRACT

An apparatus and power saving methods are disclosed. The apparatus includes a radio communication device including at least one hardware component configured to operate in a normal mode and a power saving mode. The apparatus also includes a controller configured to monitor operations of the radio communication device and to determine whether to set the at least one hardware component to operate in the normal mode or in the power saving mode. The apparatus further includes a control mechanism associated with the at least one hardware component. The control mechanism is configured to change the operation of the at least one hardware component between the normal mode and the power saving mode based on a command received from the controller.

13 Claims, 5 Drawing Sheets

POWER SAVING MODE FOR RADIO COMMUNICATION SYSTEMS

BACKGROUND

A radio communication system generally includes a transmitter, a receiver, an antenna and appropriate terminal equipment.

Classical radio communication systems use frequency division multiplexing as a strategy to split up and share the available radio frequency bandwidth for use by different parties. Frequency division multiplexing may support a radio communication system staying on a single frequency or hopping between frequencies. Modern radio communication systems support frequency division multiplexing as well as time division multiple access, which divides up a radio frequency band by time.

Time division multiple access (TDMA) is a channel access method for shared medium networks, which allows several users to share the same frequency channel by dividing the signal into different time slots. Users transmit in rapid succession, one after the other, each using a different time slot. This allows multiple stations to share the same transmission medium (e.g., radio frequency channel) while using only a part of the channel capacity. TDMA is employed in a number of military and commercial communication protocols.

SUMMARY

Embodiments of the inventive concepts disclosed herein are directed to an apparatus. The apparatus includes a radio communication device including at least one hardware component configured to operate in a normal mode and a power saving mode. The apparatus also includes a controller configured to monitor operations of the radio communication device and to determine whether to set the at least one hardware component to operate in the normal mode or in the power saving mode. The apparatus further includes a control mechanism associated with the at least one hardware component. The control mechanism is configured to change the operation of the at least one hardware component between the normal mode and the power saving mode based on a command received from the controller.

In one aspect, the inventive concepts disclosed herein are directed to a power saving method for a communication device. The method includes: determining whether a synchronization pattern is received during a synchronization time period according to a defined time structure; setting at least one hardware component located on the communication device to a power saving mode when no synchronization pattern is received during the synchronization time period, wherein the at least one hardware component remains in the power saving mode for a predetermined duration of time; and setting the at least one hardware component to a normal operation mode at the end of the predetermined duration of time.

A further embodiment of the present disclosure is also directed to a power saving method for a communication device. The method includes: cycling the communication device between a receive mode and an idle mode according to a predefined duty cycle; determining whether a signal is received when the communication device is in the receive mode; continue operating the communication device in the receive mode when the signal is received; and resume cycling between the receive mode and the idle mode according to the predefined duty cycle when no signal is received.

It is to be understood that both the foregoing general description and the following detailed description are exemplary and explanatory only and are not restrictive of the inventive concepts disclosed and claimed herein. The accompanying drawings, which are incorporated in and constitute a part of the specification, illustrate embodiments of the inventive concepts and together with the general description, serve to explain the principles and features of the inventive concepts disclosed herein.

BRIEF DESCRIPTION OF THE DRAWINGS

The numerous objects and advantages of the inventive concepts disclosed herein may be better understood by those skilled in the art by reference to the accompanying figures in which.

DETAILED DESCRIPTION

Reference will now be made in detail to exemplary embodiments of the inventive concepts disclosed herein, examples of which are illustrated in the accompanying drawings.

Radio communication systems can be powered from AC power or from battery power to support mobile communication. For mobile radio communication systems, how long a mobile device can be powered by a single charge of a battery is a major issue as batteries are generally heavy and bulky to carry. The majority of the military frequency division multiplexing and TMDA communication protocols in use today were not designed for low power operation of the radio communication system.

Embodiments of the inventive concepts disclosed herein are directed to providing power saving operation modes for radio communication systems. Modifications to radio communication systems are disclosed to reduce power consumption for communication protocols that were not designed for low power operations, allowing the radio communication systems to last longer on a given battery. Embodiments of the inventive concepts disclosed herein may modify radio communication systems by breaking up the system into many functions that are related to transmit, receive, and external interfaces with each function supporting the ability to be powered on and off by software control.

In some embodiments, hardware components on a communication device may conditionally enter a power saving mode (which may also be referred to as an idle mode) in a timely manner to reduce power consumption. Upon detection of certain events, the hardware components may exit the power saving mode in a timely manner so as to not interfere with normal operations of the communication device.

Certain embodiments of the inventive concepts disclosed herein may be configured to provide a power saving mode for communication devices (may also be referred to as radios) that operate in a TDMA network. It is noted that synchronization in a network of TDMA radios is important, and a synchronization pattern is commonly used at the beginning of a time slot or at the beginning of a newly tuned frequency (if frequency-hopping is implemented). Based on whether a synchronization pattern is detected, a decision regarding whether to enter the power saving mode may be made. An exemplary embodiment of this process is illustrated in FIG. 1.

More specifically, TDMA transmissions and receptions are carried out in units referred to as TDMA frames or epochs. A TDMA epoch 100 contains a number of time slots 102 where each radio is allowed to transmit or receive. The time slots 102 are sequentially executed during the TDMA epoch 100. In the example depicted in FIG. 1, the TDMA epoch 100 has a number of time slots 102. However, the specific number of time slots 102 defined in the TDMA epoch 100 may vary without departing from the broad scope of the inventive concepts disclosed herein.

Figure 1:
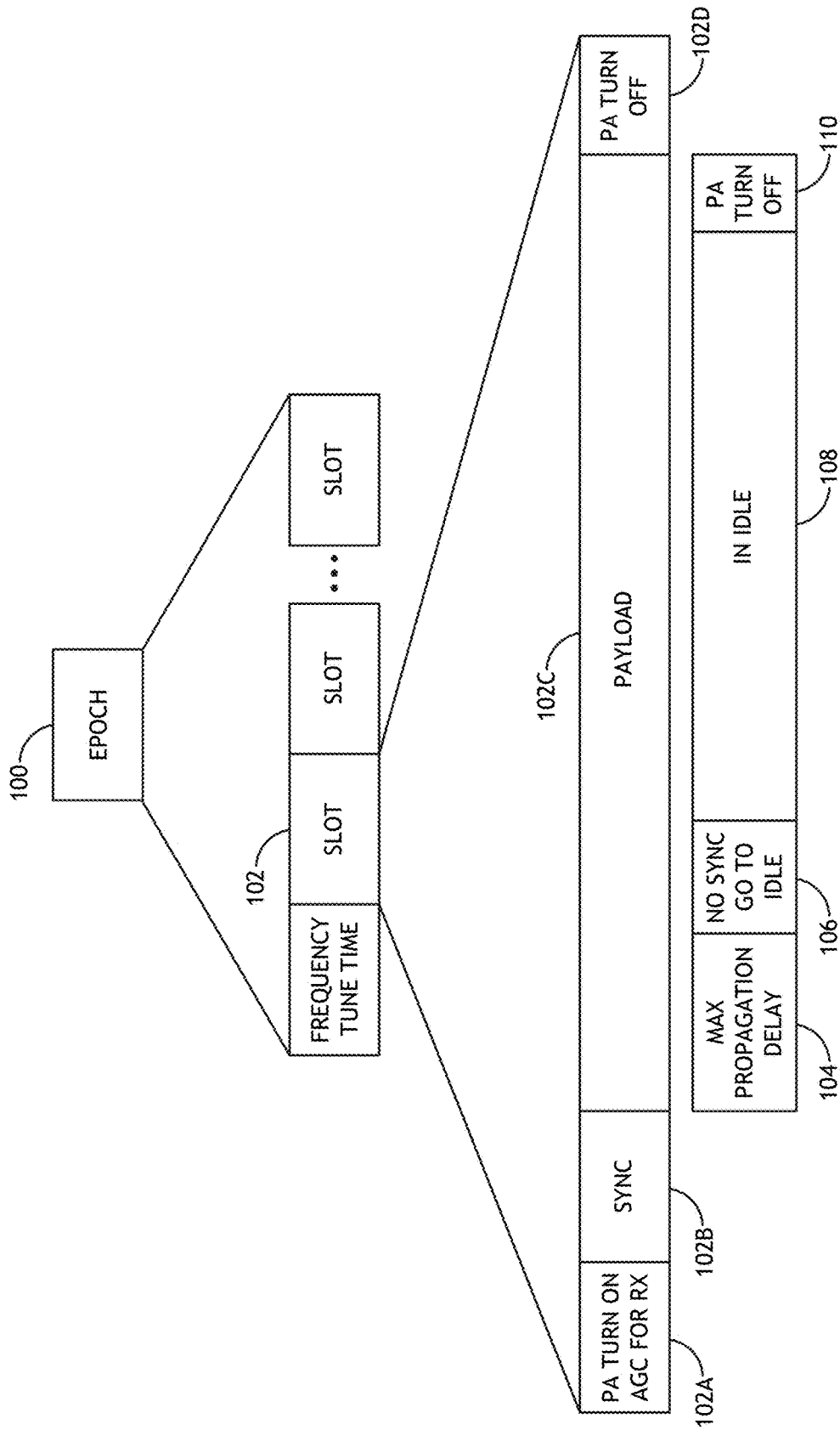
FIG. 1 is an illustration depicting operations performed within a given time slot of an epoch according to an embodiment of the inventive concepts disclosed herein.

Also depicted in FIG. 1 are the operations performed by a radio receiving a packet in a given time slot. Power amplifier(s) and the gain controller(s) located on the radio may be turned on during time period 102A to prepare the radio for reception. A synchronization pattern may be expected within a synchronization time period 102B, which may be followed by a payload time period 102C allocated for reception of a payload. The reception of the payload is terminated when the allocated time (e.g., the time period 102C) is up, the power amplifier may be turned off within time period 102D for the transmitting radio, and the radio may complete its operations for this particular time slot.

It is noted that if the synchronization pattern is not received for a given time slot, the radio will not be able to receive the payload that follows the synchronization pattern. In other words, if the synchronization pattern is not received in a given time slot, the rest of that time slot will not be productive and some hardware components located on the radio may be safely entered in a power saving mode (e.g., idle) for the rest of the time slot.

In one embodiment, a propagation delay time 104 is defined. The propagation delay time 104 starts immediately at the end of the time period 102B (the time period during which the synchronization pattern is expected), and delays the start of the power saving mode by a predetermined amount of time. If it is determined that no synchronization pattern is received at the end of the time period 102B plus the propagation delay time 104, the procedure 106 for entering the power saving mode 108 commences. It is contemplated that whether to implement the propagation delay time 104, and the specific duration of the propagation delay time 104 (if implemented), can be determined based on various factors, including, but not limited to, the maximum distance supported between the transmitter and the receiver, characteristics of the communication environment, power consumption requirements, or combinations thereof.

Once it is determined that the radio should enter the power saving mode 108, actions are carried out to put the various hardware components to idle to reduce power consumption. In some embodiments, the various hardware components may be put to idle by utilizing control mechanisms as shown in FIG. 2.

Figure 2:
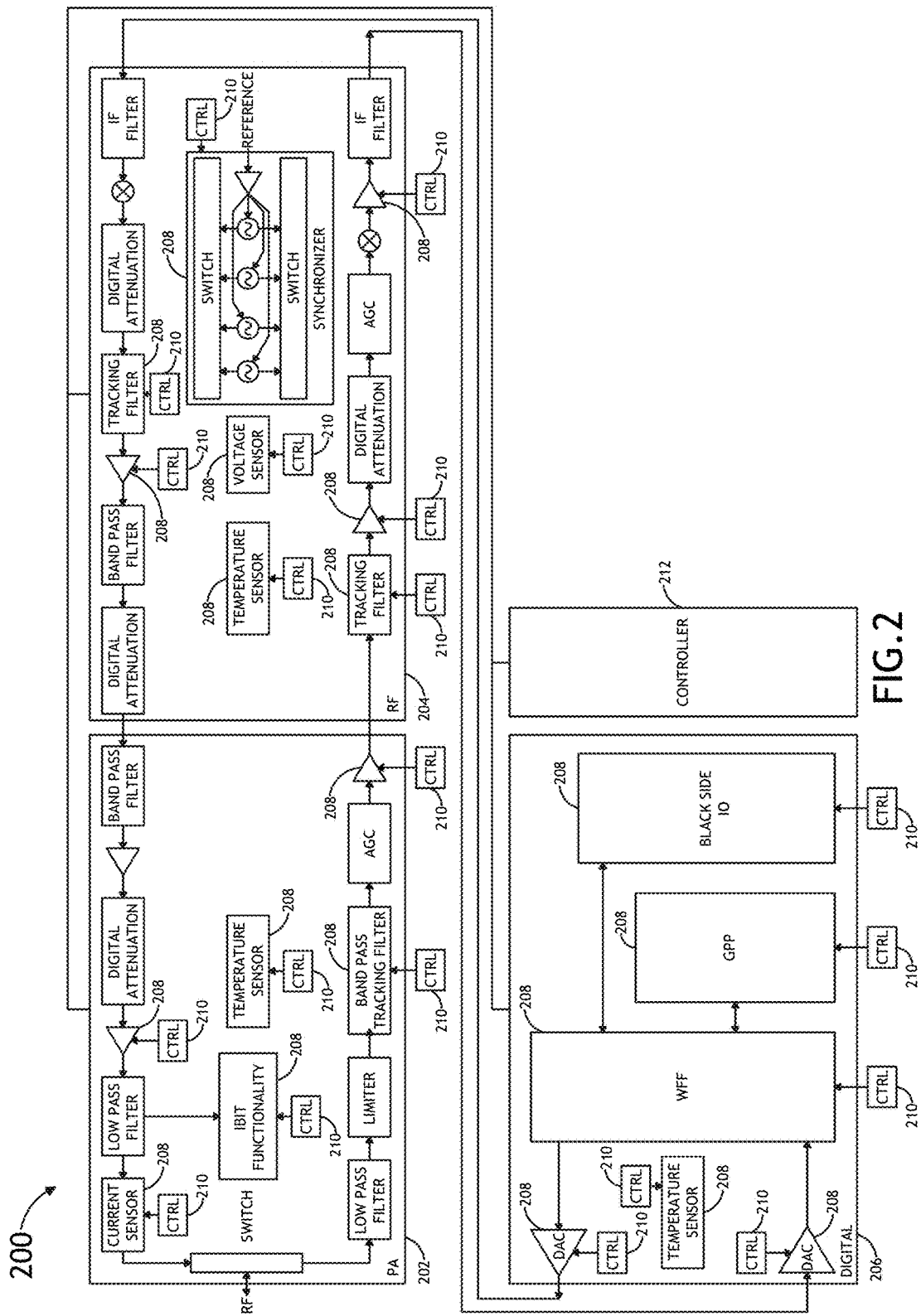
FIG. 2 is a block diagram depicting an embodiment of control mechanisms utilized in a radio for controlling various hardware components of the radio.

More specifically, FIG. 2 is a block diagram depicting an embodiment of control mechanisms 210 utilized in a radio 200 for controlling various hardware components of the radio 200. In the example depicted in FIG. 2, the radio 200 includes a power amplifier circuit board 202, a receiver circuit board 204, and a digital modem circuit board 206. It is to be understood that the radio 200 and the circuit boards 202, 204 and 206 depicted are merely exemplary. Control mechanisms 210 in accordance with the present disclosure may be utilized in different types of radios having different types of circuit boards without departing from the broad scope of the inventive concepts disclosed herein.

In one embodiment, certain hardware components 208 of the radio 200 may be power-controllable. Power-controllable hardware components 208 may be selected because they may be powered off when the radio 200 is not expected to receive a payload. Another selection criterion may be that the hardware components 208 are configured to rapidly switch between idle mode and normal operation mode. That is, if a hardware component has an initialization process before it becomes fully operational, for example, the hardware component may not be an optimal candidate for being a power-controllable hardware component 208.

It is to be understood that the hardware components depicted in FIG. 2 are merely exemplary. Various components located on the radio may be selected to be power-controllable and may conditionally enter the power saving mode without departing from the broad scope of the inventive concepts disclosed herein. For instance, analog-to-digital converter(s) and digital-to-analog converter(s) utilized in a modem associated with the radio may be power controllable. Similarly, power amplifiers, including tracking filters, temperature sensors, current sensors, built-in test circuits and the like, may also be power controllable. Other components that may be power controllable may include, but are not limited to: radio front end components such as tracking filters, amplifiers, temperature sensors, voltage sensors; receiver/exciter components such as translator amplifiers, local oscillator amplification stages, temperature sensors, voltage sensors; and synthesizer components such as powered switches, local oscillator drivers, or combinations thereof.

In some embodiments, the control mechanisms 210 utilized to put the various hardware components 208 to idle may be configured to do so in a timely manner to maximize the idling time 108. For instance, each hardware component 208 may be associated with a dedicated control mechanism 210 that is in communication with a controller 212. Once the controller 212 (e.g., a processor located on the radio 200) decides to enter the power saving mode, the controller 212 sends a control command to each control mechanism 210. Each control mechanism 210, upon receiving the control command from the controller 212, may operate independently to change the operational state of the hardware component 208 controlled by the control mechanism 210. This configuration allows the radio 200 to put the various hardware components 208 to idle substantially simultaneously, which reduces the overall time needed to complete the procedure 106. It is to be understood, however, that dedicating a control mechanism 210 to each power controllable hardware component 208 is only exemplary, and that in some embodiments one or more control mechanism 210 may be configured to control multiple hardware components 208 without departing from the broad scope of the inventive concepts disclosed herein.

It is noted that the control mechanisms 210 may be configured to bring the various hardware components 208 out of the power saving mode in a timely manner, for example, to make the power saving mode transparent to the communication protocol and/or frequency-hopping. In some embodiments, the total amount of time that includes: 1) the propagation delay time 104, 2) the amount of time 106 that is needed to put the various hardware components 208 to idle, 3) the amount of time 108 that the hardware components 208 are actually idling, and 4) the amount of time 110 that is needed to bring the hardware components 208 back to normal operation, may be set to be no greater than the period of time 102C allocated for receiving a payload. In other words, the time period between the first time instance when the controller 210 commands the control mechanisms 208 to put the various hardware components 208 to idle and the second time instance when the controller 210 commands the control mechanisms 208 to bring the various hardware components 208 back to normal operation may be fully contained within the payload time period 102C. In this manner, other devices/radios in the same TDMA network do not need to be aware of the operations taking place within the particular radio 200, making the power saving mode completely transparent.

Figure 3:
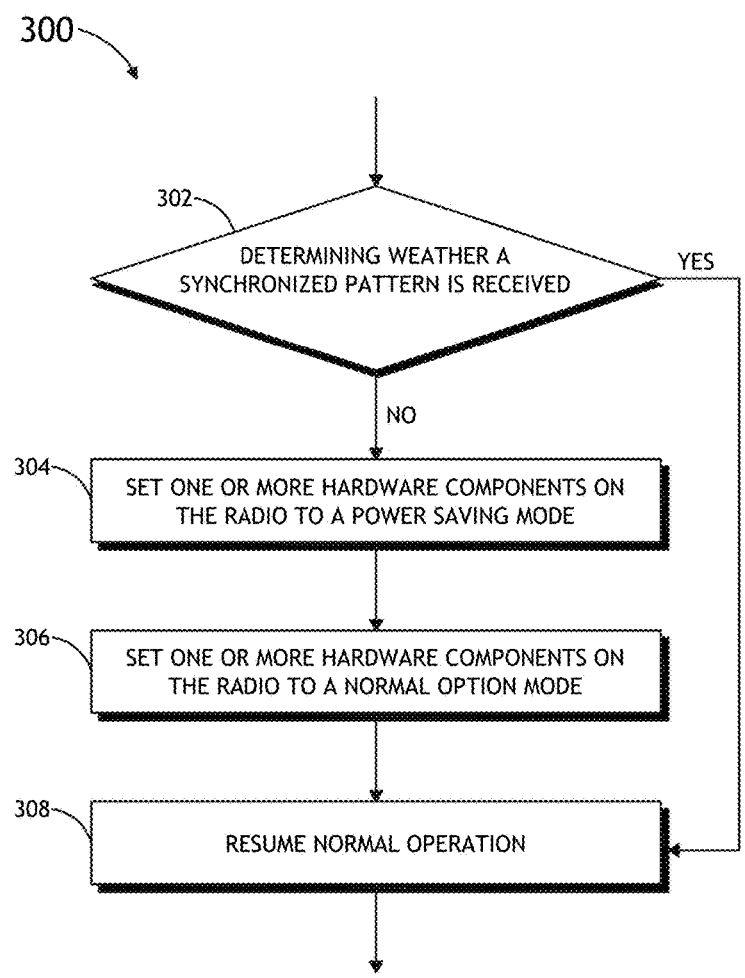
FIG. 3 is a flow diagram depicting an embodiment of a method for providing a power saving mode for a radio that implements time division multiplexing according to the inventive concepts disclosed herein.

Referring to FIG. 3, a flow diagram depicting an embodiment of a method 300 for providing a power saving mode for a radio that implements time division multiplexing is shown. In a step 302, a controller located on the radio determines whether a synchronization pattern is detected when the radio is set to receive a payload in a given time slot. If the synchronization pattern is detected in step 302, normal operations continue in step 308. If no synchronization pattern is detected in step 302, the controller sends a signal to one or more control mechanisms to set one or more hardware components on the radio to a power saving mode in step 304. The hardware components set to the power saving mode may remain in the power saving mode until the controller sends another signal to the control mechanisms to set the hardware components back to a normal operation mode in step 306, and normal operations resumes in step 308.

It is contemplated that the method 300 for providing the power saving mode as described above is applicable to any radio that implements time division multiplexing, including radios operating in any conventional and/or ad-hoc time slot allocation TDMA networks. It is noted that the method 300 takes advantage of the fact that synchronization patterns are sent at the beginning of each time slot in most TDMA waveforms. The method 300 may also take advantage of the fact that the synchronization pattern is much shorter in duration than the rest of the time slot used for data communication. The method efficiently reduces power consumption by turning off a majority of the receive hardware if the sync pattern is not received.

It is also contemplated that implementation of a power saving mode according to embodiments of the inventive concepts disclosed herein is not limited to radios that utilize time division multiplexing. For instance, embodiments of the power saving mode may also be implemented in communication technologies that predate TDMA, which may collectively be referred to as legacy waveforms. Legacy waveforms may be narrowband (low data rate), relatively slow (long pulses), have no time structure, and can tolerate some loss of voice/data. Frequency division multiplexing is an exemplary communication technology that can be modified to support the power saving mode according to the inventive concepts disclosed herein.

It is noted that frequency division multiplexing communication protocols do not have fixed time when information is expected to be received. Instead, detection algorithms are utilized by the radios to detect reception of information. Certain embodiments of the inventive concepts disclosed herein may therefore modify the receive detection algorithms utilized by the radios and adapt the receive detection algorithms for low power operation. For instance, by turning on and off the receive detection algorithm defined for each communication protocol, power consumption can be reduced. The timing between how long the receive detection algorithm is turned on and off for a given radio is determined by the communication protocol characteristics. Once determined, the radio may turn the receive detection algorithm on and off accordingly in a repetitive manner, forming duty cycles.

Figure 4:
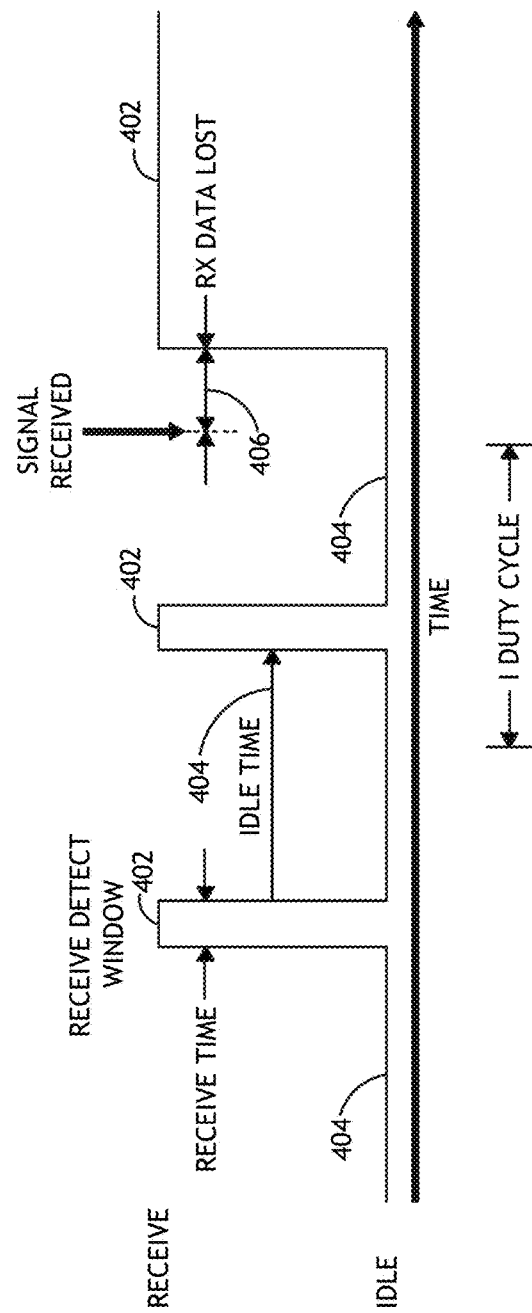
FIG. 4 is an illustration depicting an embodiment of duty cycles defined to implement a power saving mode in frequency division multiplexing communication protocols according to the inventive concepts disclosed herein.

More specifically, referring to FIG. 4, a duty cycle between a receive mode of operation 402 and an idle mode of operation 404 defined at a particular rate to support a given waveform is shown. The radio cycles according to this duty cycle and detects whether any voice/data signal is received when the radio is in the receive mode 402. If no signal is received, the radio continues cycling between the receive mode 402 and idle mode 404. On the other hand, if a voice/data signal is detected, the radio may stay in the receive mode 402 to receive the rest of the signal. The radio may continue operating in the receive mode 402 for a predetermined amount of time even after the signal is no longer detected to ensure the reception has in fact ended. If no signal is detected at the end of this predetermined amount of time, the radio may switch back to cycling between the receive mode 402 and the idle mode 404 again according to the defined duty cycle.

It is noted that if a signal arrives when the radio is in the idle mode 404, this signal may not be processed until the radio cycles to the receive mode 402 again according to the defined duty cycle. The voice/data transmitted between the time when the signal first arrived and when the signal is actually received by the radio, denoted as 406 in FIG. 4, may be lost. However, it is noted that because legacy waveforms generally have lower data rates and longer pulses, some loss of voice/data at the very beginning of the transmission can be tolerated. If fact, for practical purposes, the radio cycles through the receive mode 402 and the idle mode 404 in a time unit (e.g., in the order of milliseconds) that is much faster than the speed of a normal radio conversations, and therefore, the voice/data loss that may occur at the very beginning of the transmission may be unnoticed in most cases.

It is contemplated that the hardware support (e.g., the control mechanisms and the like) for carrying out the mode changes between receive mode and idle mode may be similar to the hardware support previously described. Similarly, in some embodiments, the control mechanisms utilized to change the operation mode of the various hardware components are configured to do so in a timely manner as previously described.

Figure 5:
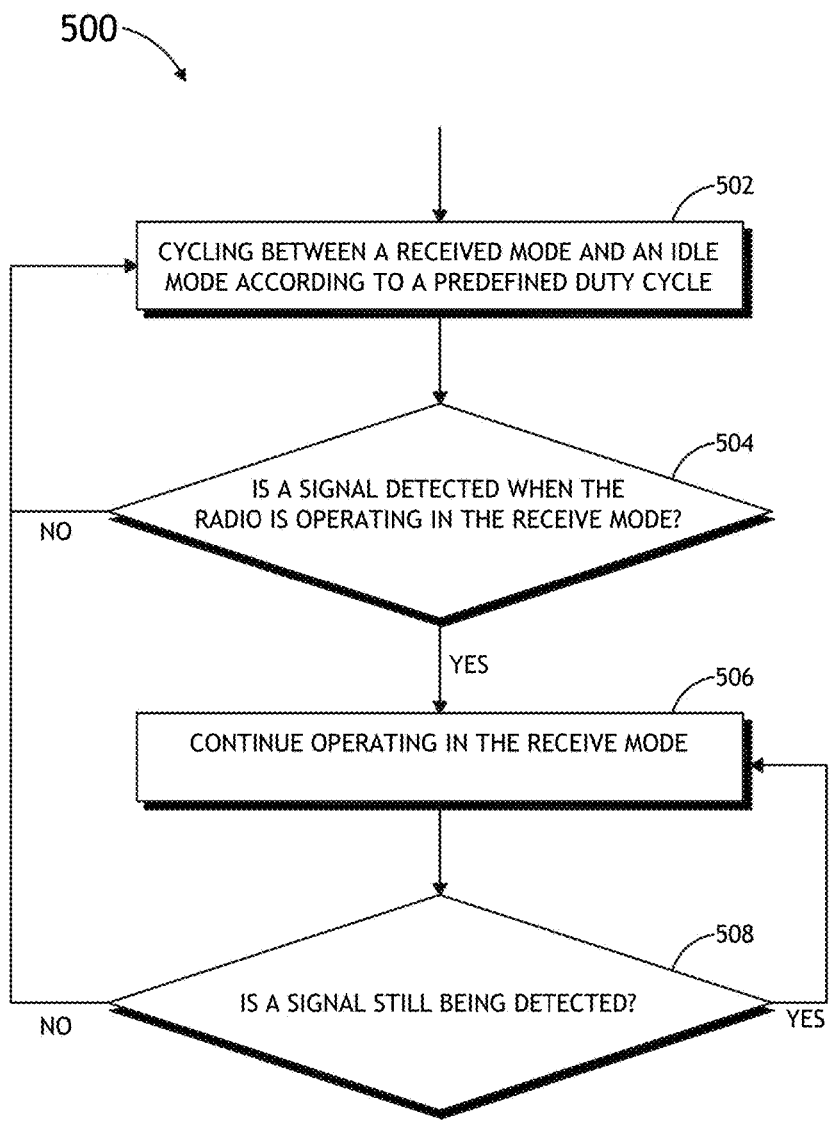
FIG. 5 is a flow diagram depicting an embodiment of a method for providing a power saving mode for a frequency division multiplexing communication protocol according to the inventive concepts disclosed herein.

Referring to FIG. 5, a flow diagram depicting an embodiment of a method 500 for providing a power saving mode for a radio that implements a legacy waveforms (i.e., waveforms with no defined time structure) is shown. In a step 502, a controller located on the radio or coupled with the radio implements a predefined duty cycle. The radio is set to cycle between a receive mode of operation and an idle mode of operation on a continuous basis, until a signal is detect in a step 504 when the radio is operating in the receive mode. Once the signal is detected, cycling between the receive mode and the idle mode is temporarily halted in a step 506, and the radio may continue operating in the receive mode.

The controller, however, is configured to keep monitoring the reception of signals. If it is determined in step 508 that the radio continues to receive signals, the radio may continue its operations in the receive mode. On the other hand, if no signal is detected for a predetermined amount of time, the controller may reinstitute the duty cycle and repeat from step 502.

It is to be understood that embodiments of the inventive concepts described in the present disclosure are not limited to any underlying implementing technology. Embodiments of the inventive concepts of the present disclosure may be implemented utilizing any combination of software and hardware technology and by using a variety of technologies without departing from the broad scope of the inventive concepts or without sacrificing all of their material advantages.

It is noted that embodiments of the inventive concepts disclosed herein support frequency division multiplexing as well as TMDA communication protocols. It is to be understood that the specific order or hierarchy of steps in the processes disclosed is an example of exemplary approaches. It is to be understood that the specific order or hierarchy of steps in the processes may be rearranged while remaining within the broad scope of the present disclosure. The accompanying method claims present elements of the various steps in a sample order, and are not meant to be limited to the specific order or hierarchy presented.

It is believed that the inventive concepts disclosed herein and many of their attendant advantages will be understood by the foregoing description, and it will be apparent that various changes may be made in the form, construction, and arrangement of the components thereof without departing from the broad scope of the inventive concepts or without sacrificing all of their material advantages. The form herein before described being merely an explanatory embodiment thereof, it is the intention of the following claims to encompass and include such changes.

What is claimed is:

1. An apparatus, comprising:
    a radio communication device including a plurality of hardware components, the plurality of hardware components include an analog-to-digital converter, a digital-to-analog converter, an amplifier, a filter, and a local oscillator driver, the plurality of hardware components are configured to operate in a normal mode and a power saving mode;
    a controller configured to monitor operations of the radio communication device and to determine whether to set the plurality of hardware components to operate in the normal mode or in the power saving mode based on whether a synchronization pattern is received during a synchronization time period of a defined time structure plus a propagation delay time, the controller including a processor, wherein the plurality of hardware components are set to the power saving mode when no synchronization pattern is received during the synchronization time period of the defined time structure plus the propagation delay time; and
    a plurality of control mechanisms configured to operate independently to control operations of the plurality of hardware components, the plurality of control mechanisms in communication with the controller and configured to change the operation of its respective hardware component of the plurality of hardware components between the normal mode and the power saving mode based on a command received from the controller.

2. The apparatus of claim 1, wherein the radio communication device is configured to transmit and receive signals according to a defined time structure including a synchronization time period and a payload time period, and wherein the controller is further configured to:
    determine whether a synchronization pattern is received during the synchronization time period of the defined time structure;
    command the dedicated control mechanism, at a first time instance, to set the respective hardware component to the power saving mode when no synchronization pattern is received during the synchronization time period of the defined time structure, wherein the respective hardware component remains in the power saving mode for a predetermined duration of time; and
    command the dedicated control mechanism, at a second time instance, to set the respective hardware component to the normal operation mode at the end of the predetermined duration of time.

3. The apparatus of claim 2, wherein a time period between the first time instance and the second time instance is fully contained within the payload time period.

4. The apparatus of claim 1, wherein the controller is configured to:
    command the dedicated control mechanism to cycle the respective hardware component between the normal mode and the power saving mode according to a predefined duty cycle;
    determine whether a signal is received when the respective hardware component is in the normal mode;
    allow the respective hardware component to continue in the normal mode when the signal is received; and
    command the dedicated control mechanism to resume cycling the respective hardware component between the normal mode and the power saving mode according to the predefined duty cycle when no signal is received.

5. The apparatus of claim 4, wherein the controller is configured to:
    command the dedicated control mechanism to resume cycling the respective hardware component between the normal mode and the power saving mode according to the predefined duty cycle when no signal is received for a predetermined amount of time.

6. A power saving method for a communication device, comprising:
    (a) determining whether a synchronization pattern is received during a synchronization time period according to a defined time structure plus a propagation delay time;
    (b) setting a plurality of hardware components located on the communication device to a power saving mode when no synchronization pattern is received during the synchronization time period according to the defined time structure plus the propagation delay time, wherein the plurality of hardware components remain in the power saving mode for a predetermined duration of time; and
    (c) setting the plurality of hardware components to a normal operation mode at the end of the predetermined duration of time,
    wherein steps (a), (b) and (c) are performed with in a payload time period according to the defined time structure, wherein the plurality of hardware components are controlled by a plurality of control mechanisms configured to operate independently to control operations of setting the plurality of hardware components to the power saving mode and setting the plurality of hardware components to the normal operation mode, wherein the plurality of hardware components include an analog-to-digital converter, a digital-to-analog converter, an amplifier, a filter, and a local oscillator driver.

7. The method of claim 6, further comprising:
(d) delaying execution of setting the plurality of hardware components to the power saving mode by a propagation delay time,
wherein steps (a), (b), (c) and (d) are performed with in the payload time period according to the defined time structure.

8. The method of claim 6, wherein the defined time structure is a time division multiplexing structure.

9. The method of claim 6, wherein the communication device is configured to operate within a time division multiple access (TDMA) network.

10. The method of claim 9, wherein the communication device is configured to operate within the TDMA network based on ad-hoc time slot allocation.

11. A power saving method for a communication device, comprising:
dedicating a plurality of control mechanisms to control operations of a plurality of hardware components located on the communication device;
cycling the communication device between a receive mode and an idle mode according to a predefined duty cycle;
determining whether a signal is received when the communication device is in the receive mode;
continue operating the communication device in the receive mode when the signal is received; and
resume cycling between the receive mode and the idle mode according to the predefined duty cycle when no signal is received, wherein the plurality of control mechanisms are configured to operate independently to control operations of the plurality of hardware components, wherein the plurality of hardware components operate in a normal mode and a power saving mode and, wherein the plurality of hardware components include an analog-to-digital converter, a digital-to-analog converter, an amplifier, a filter, and a local oscillator driver.

12. The method of claim 11, further comprising:
determining whether the communication device continues to receive signals when the communication device is set to continue operating in the receive mode;
continue operating in the receive mode when the communication device continues to receive signals; and
resume cycling between the receive mode and the idle mode according to the predefined duty cycle when no signal is received at the communication device for a predetermined amount of time.

13. The method of claim 11, wherein the cycling between the receive mode and the idle mode is performed in an order of milliseconds.

* * * * *